D. HARRIS.
Cultivator.

No. 56,555.

Patented July 24, 1866.

Witnesses:

Inventor:
Daniel Harris
Per Munn & Co
Attorneys

UNITED STATES PATENT OFFICE.

DANIEL HARRIS, OF CANAAN, MAINE.

IMPROVEMENT IN HORSE-HOES.

Specification forming part of Letters Patent No. 56,555, dated July 24, 1866.

*To all whom it may concern:*

Be it known that I, DANIEL HARRIS, of Canaan, in the county of Somerset and State of Maine, have invented a new and Improved Horse-Hoe; and I do hereby declare that the following is a full, clear, and exact description thereof, which will enable others skilled in the art to make and use the same, reference being had to the accompanying drawings, forming part of this specification, in which—

Figure 1:
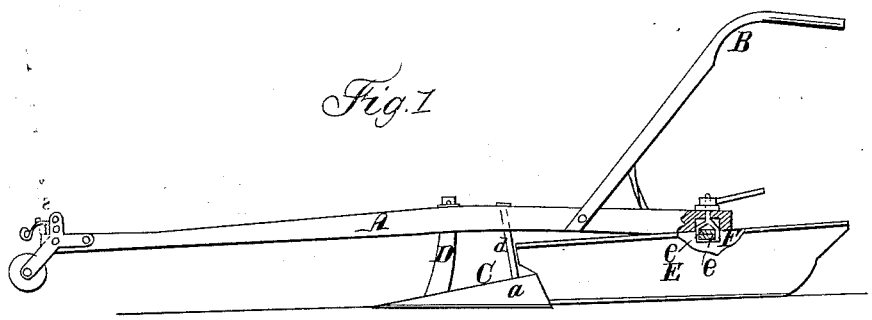
Figure 3:
Figure 2:
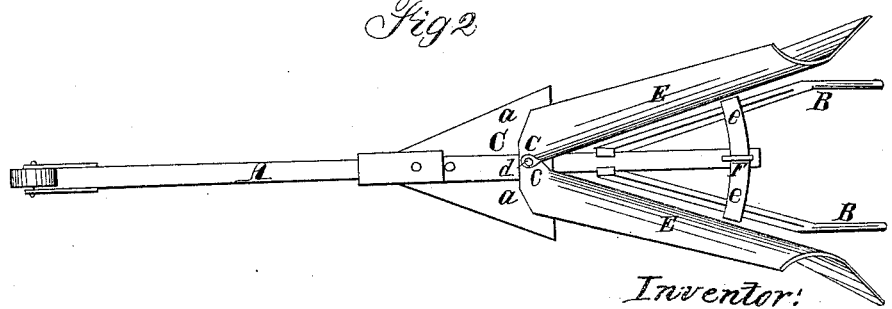

Figure 1 is a side view of my invention partly in section; Fig. 2, an inverted plan of the same; Fig. 3, a detached front view of the share pertaining to the same.

Similar letters of reference indicate like parts.

This invention relates to a new and improved device for hoeing or cultivating crops which are grown in hills or drills, and which I term a "horse-hoe," the same being designed for throwing the earth toward the plants.

The invention consists in a novel construction of two adjustable mold-boards and a share connected together and applied to a beam in such a manner as to form a very simple implement for the purpose specified, and one which will perform the work thoroughly or in a perfect manner.

A represents the beam of the device, and B B the handles thereof. C is the share, constructed of steel plate, swaged or bent in such a manner as to have two inclined sides, $a$ $a$, as shown clearly in Fig. 3. The share is of V form and is inclined longitudinally, gradually rising from its front end or point to its rear end, as shown in Fig. 1. The sides $a$ $a$ are therefore inclined in two different directions—to wit, in a transverse direction with the share and in a longitudinal direction therewith. The share is formed with a central portion, $b$, which is horizontal in its transverse section, but inclined longitudinally, said central portion extending beyond the front ends of the sides $a$ $a$ and forming the point of the share. The share is connected to the beam A by means of a standard, D, which will serve the purpose of a colter, its front edge being sufficiently sharp to cut through sod and small roots under a light draft.

E E represent two mold-boards, which are also constructed of steel plate, and of curved form in their transverse section, the curvature being such as to throw or cast the earth over and off from the device similar to the mold-board of an ordinary plow, and the lower edges of said mold-boards serve as scrapers or cutters and readily cut through the soil, fine roots, &c., rendering the draft of the implement quite light. The front ends of the mold-boards are slitted longitudinally for a short distance, and the mold-boards below the slits bent or curved inward to form lips $c$ $c$, which lap over each other and have a pivot-bolt, $d$, passing vertically through them, said bolt passing through the beam A and the rear part of share C. This mode of connecting the mold-boards to the share admits of the former being expanded or contracted to suit the width of the spaces between the rows of plants; and the mold-boards are retained in the desired position by means of a clamp, F, composed of an eye formed on a screw-bolt, which passes through the beam, bars $e$ $e$, which are attached to the inner sides of the mold-boards, passing through the eye. (See Figs. 1 and 2.)

This invention has been practically tested and found to answer an admirable purpose, performing its work in a thorough manner.

The share C and mold-boards E E may be constructed of saw-plates. That is an excellent material for the purpose.

Having thus described my invention, what I claim as new, and desire to secure by Letters Patent, is—

The share C, constructed or formed with sides $a$ $a$ inclined both transversely and longitudinally, and also formed with a central longitudinally-inclined surface, $b$, having a horizontal position in its transverse section, in combination with the adjustable mold-boards E E, pivoted to the rear of the share C, and retained in position by the clamp F and bars $e$ $e$, all arranged substantially in the manner as and for the purpose set forth.

DANIEL HARRIS.

Witnesses:
H. B. KEENE,
DANIEL S. HERRIN.